United States Patent
Kågebäck et al.

(10) Patent No.: US 10,334,779 B2
(45) Date of Patent: Jul. 2, 2019

(54) BALANCED TRIM SHIELD WITH A SINGLE, DUAL DIRECTION LINE CUTTING MEMBER

(71) Applicant: HUSQVARNA AB, Huskvarna (SE)

(72) Inventors: Mikael Kågebäck, Jönköping (SE); Henrik Hvitman, Norrahammar (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/312,020

(22) PCT Filed: May 19, 2014

(86) PCT No.: PCT/EP2014/060200
§ 371 (c)(1),
(2) Date: Nov. 17, 2016

(87) PCT Pub. No.: WO2015/176736
PCT Pub. Date: Nov. 26, 2015

(65) Prior Publication Data
US 2017/0086369 A1    Mar. 30, 2017

(51) Int. Cl.
*A01D 34/416*    (2006.01)
*A01D 101/00*    (2006.01)

(52) U.S. Cl.
CPC ...... *A01D 34/4167* (2013.01); *A01D 2101/00* (2013.01)

(58) Field of Classification Search
CPC .................. A01D 34/4167; A01D 2101/00
(Continued)

(56) References Cited

U.S. PATENT DOCUMENTS 4,823,464 A * 4/1989 Gorski .................. A01G 3/062
30/276
7,406,771 B2 8/2008 Zimmermann et al.
(Continued)

FOREIGN PATENT DOCUMENTS

DE    102005035024 A1    2/2007
WO    2011005156 A1    1/2011
WO    2013062457 A1    5/2013

OTHER PUBLICATIONS

International Search Report and Written Opinion for International Application No. PCT/EP2014/060200 dated Feb. 18, 2015.
(Continued)

*Primary Examiner* — Omar Flores Sanchez
(74) *Attorney, Agent, or Firm* — Burr Forman McNair

(57) ABSTRACT

A hand-held cutting device (10) may include an elongated member (45) graspable along a portion thereof by an operator, a trimmer head (25) disposed at one end of the elongated member (45) and configured to be rotatable to perform a cutting function using trimmer line (70) held at a portion of the trimmer head (25), a power unit operably coupled to the trimmer head (25) to selectively cause rotation of the trimmer head, and a trim shield (65) disposed to extend away from the elongate member (45) to a position radially outward relative to the trimmer head (25) proximate to at least a portion of a path traced by a distal end of the trimmer line (70) when the trimmer head is rotated. The trim shield (65) may include a first housing portion (100) disposed on one side of a longitudinal centerline (120) of the device, a second housing portion (110) disposed on an opposite side of the longitudinal centerline (120) and substantially symmetrical relative to the first housing portion, a cutter mount (130) and a cutter member (140). The cutter mount (130) may be disposed at the longitudinal centerline (120) on an interior portion of the trim shield (65) proximate to an intersection of the first housing portion (100) and second housing portion (110). The cutting member (140) may be operably coupled to the cutter mount (130) with substantially equal portions of the cutting member (140) extending to respective opposing sides of the longitudinal centerline (120).

18 Claims, 2 Drawing Sheets

Figure 1:
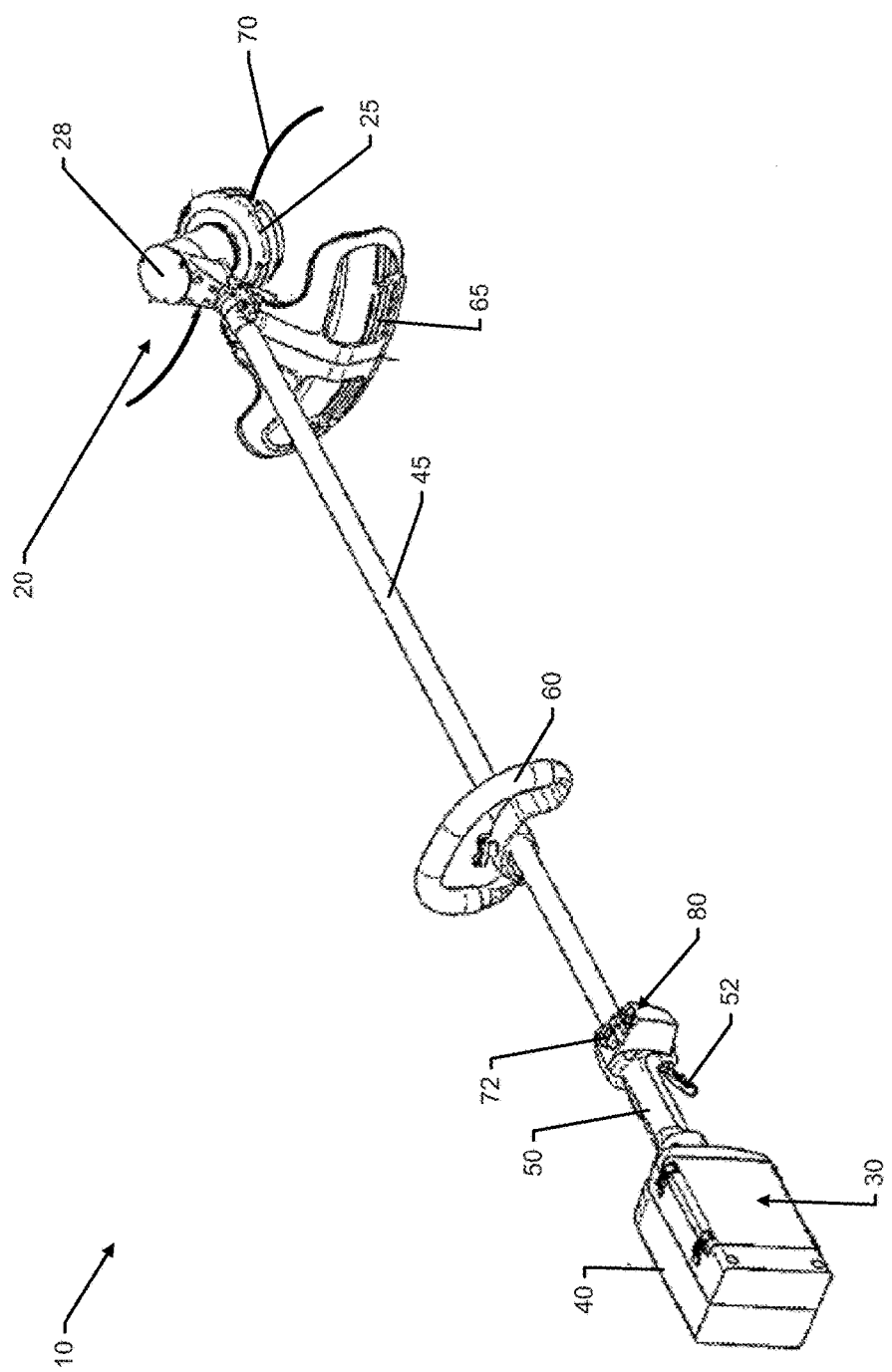

(58) Field of Classification Search
USPC .......................................................... 30/276
See application file for complete search history.

(56) References Cited

U.S. PATENT DOCUMENTS

| | | | | |
|---|---|---|---|---|
| 2011/0214294 A1* | 9/2011 | Galinski | ............ | A01D 34/4163 30/276 |
| 2011/0277328 A1* | 11/2011 | Hurley | ............... | A01D 34/4167 30/286 |
| 2012/0102755 A1* | 5/2012 | Racov | ................ | A01D 34/4167 30/142 |
| 2012/0227270 A1* | 9/2012 | Ito | ...................... | A01D 34/4167 30/286 |
| 2013/0031788 A1* | 2/2013 | Ohno | .................... | A01D 34/90 30/276 |
| 2016/0330903 A1* | 11/2016 | Miller | ................ | A01D 34/4167 |
| 2017/0086369 A1* | 3/2017 | Kageback | .......... | A01D 34/4167 |

OTHER PUBLICATIONS

International Preliminary Report on Patentability for International Application No. PCT/EP2014/060200 dated Nov. 22, 2016.

* cited by examiner

_US 10,334,779 B2_

BALANCED TRIM SHIELD WITH A SINGLE, DUAL DIRECTION LINE CUTTING MEMBER

TECHNICAL FIELD

Example embodiments generally relate to an outdoor power device that employ trimmer line and, more particularly, relate to a trim shield employing a single, multi-directional trimmer knife.

BACKGROUND

Handheld outdoor power devices such as trimmers, blowers, chainsaws, and/or the like, are often used to perform tasks relating to yard/grounds maintenance or even commercial resource harvesting activities that require them to be mobile. Although there are several options for powering such devices, including combustion engines, corded electric motors, or battery powered electric motors, each option may be viewed as having advantages in certain environments and for certain users.

Some trimming devices employ a trimmer line and are referred to as string trimmers. Alternatively, such devices may be known as edge trimmers, line trimmers, weed whips and/or the like. The trimmer line, which may be a monofilament line, is quite effective at cutting when rotated at high speed. Such a trimmer line is extended and held somewhat rigid by centrifugal forces while being rotated. The trimmer line is wound upon a reel or spool and the trimmer line can be released by bumping the trimmer head on the ground during operation. Historically, a knife is placed at one end of a trim shield of the trimmer to cut the line to an appropriate length as the line swings by the trim shield. The knife and the trim shield are often shaped and positioned in contemplation of a single direction of rotation.

BRIEF SUMMARY OF SOME EXAMPLES

Some example embodiments may be provided to improve trimmer design and decrease vibration levels of such devices. In some examples, a dual direction trimmer device may be provided with a trim shield and knife that are able to cut the trimmer line regardless of the direction of rotation of the trimmer head. However, the trim shield and knife may be provided to give the device improved balance so that low levels of vibration are encountered regardless of the direction of rotation.

In one example embodiment, a hand-held cutting device is provided. The device may include an elongated member graspable along a portion thereof by an operator, a trimmer head disposed at one end of the elongated member and configured to be rotatable to perform a cutting function using trimmer line held at a portion of the trimmer head, a power unit operably coupled to the trimmer head to selectively cause rotation of the trimmer head, and a trim shield disposed to extend away from the elongate member to a position radially outward relative to the trimmer head proximate to at least a portion of a path traced by a distal end of the trimmer line when the trimmer head is rotated. The trim shield may include a first housing portion disposed on one side of a longitudinal centerline of the device, a second housing portion disposed on an opposite side of the longitudinal centerline and substantially symmetrical relative to the first housing portion, a cutter mount and a cutter member. The cutter mount may be disposed at the longitudinal centerline on an interior portion of the trim shield proximate to an intersection of the first housing portion and second housing portion. The cutting member may be operably coupled to the cutter mount with substantially equal portions of the cutting member extending to respective opposing sides of the longitudinal centerline.

In another example embodiment, a trim shield for a hand-held cutting device that provides the trim shield proximate to an end of an elongated member graspable along a portion thereof by an operator is provided. The trim shield may be disposed proximate to a trimmer head provided at one end of the elongated member and configured to be rotatable to perform a cutting function using trimmer line held at a portion of the trimmer head. The trim shield may include a first housing portion disposed on one side of a longitudinal centerline of the device, a second housing portion disposed on an opposite side of the longitudinal centerline and substantially symmetrical relative to the first housing portion, a cutter mount and a cutting member. The cutter mount may be disposed at the longitudinal centerline on an interior portion of the trim shield proximate to an intersection of the first housing portion and the second housing portion. The cutting member may be operably coupled to the cutter mount with substantially equal portions of the cutting member extending to respective opposing sides of the longitudinal centerline.

BRIEF DESCRIPTION OF THE SEVERAL VIEWS OF THE DRAWING(S)

Figure 2:
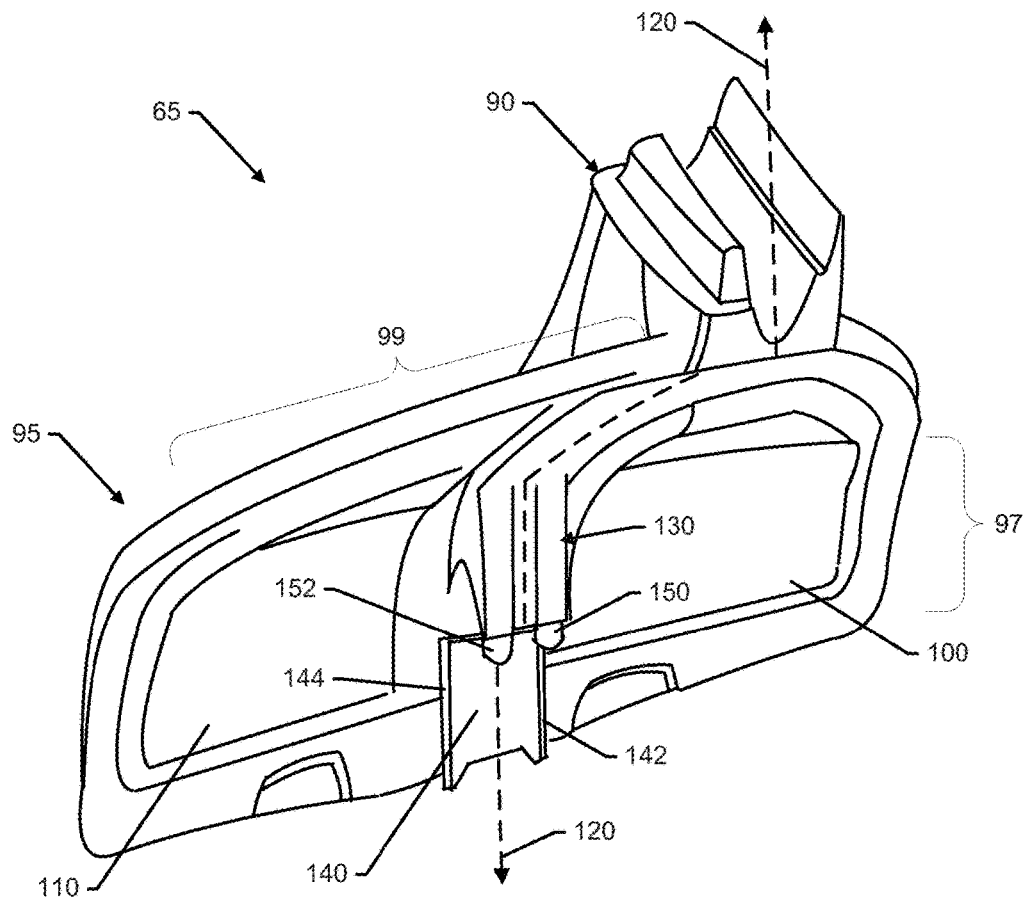

Having thus described the invention in general terms, reference will now be made to the accompanying drawings, which are not necessarily drawn to scale, and wherein:

FIG. 1 illustrates a perspective view of an electric powered trimmer that may be configured in accordance with an example embodiment; and FIG. 2 illustrates a perspective view an internal portion of a trim shield in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. One of skill in the art will appreciate the normal position in which devices of example embodiments are held for operation and that the working assembly represents the front of such devices. All other directional references should be understood in this general context.

A conventional line trimmer generally rotates in a single direction. The trim shield of the trimmer is therefore constructed to direct debris generated responsive to cutting in contemplation of only a single direction of rotation of the cutting head. Meanwhile the knife is also placed on the trim shield at a leading edge of the trim shield relative to the direction of rotation of the trimmer line. Accordingly, the trim shield is often not symmetrical.

With the advent of electric motors being commonly employed in line trimmers, reversing the direction of rotation of the trimmer head may become a relatively easy thing to do. Thus, it should be contemplated that dual direction trimmer head rotation may be employed. However, simply duplicating the single direction design may result in excess components, excess weight, and balance or design issues. With greater weight, and a higher numbers of components, the cost of the devices increases and the fatigue experienced by users is also increased if the device generates excessive vibration during operation.

Accordingly, some example embodiments described herein provide a line trimmer line that employs a balanced trim shield with minimal components and weight to help maintain vibration levels at a minimum.

Referring to the drawings, FIG. 1 shows an electric powered trimmer 10 that may be configured in accordance with an example embodiment. However, it should be appreciated that the trimmer 10 of FIG. 1 is merely one example of an electric powered, trimmer that may be configured in accordance with an example embodiment. Thus, example embodiments could alternatively be employed in connection with corded versions of string trimmers, and could be employed in connection with other particular designs for the handle and body portions of the string trimmer. Moreover, in some cases, example embodiments could also be practiced in connection with combustion engines that are configured to turn an output shaft, so long as some conversion mechanism was provided to enable operation in two directions. Thus, although an example embodiment will be described hereinafter with specific reference to the battery powered trimmer 10 of FIG. 1, the applicability of alternative embodiments relative to other types of devices should be well understood.

As shown in FIG. 1, the trimmer 10 may include a working implement or working assembly 20, which in this example includes a rotatable trimmer head 25. The working assembly 20 may further include a motor (e.g., an electric motor) disposed in a housing 28 of the working assembly 20. However, for gas powered embodiments and for some electrically powered embodiments, the motor may be disposed remotely with respect to the trimmer head 25, and power may be transferred to the trimmer head 25 via couplings provided in the housing 28. The motor of the trimmer 10 may be powered, according to this example, by a battery pack 30. The battery pack 30 is received into a battery compartment of the trimmer 10. It should be appreciated that the battery pack 30 and/or motor of this example form a power unit that can turn the working assembly 20. However, in other examples, the power unit may include a combustion engine or other suitable power source.

The battery compartment may be a recess or cavity formed in a casing 40 of the trimmer 10 disposed at one end of an elongated member 45 that may further include the working assembly 20 at an opposite end thereof. The elongated member 45 may be a hollow tube, pipe, rod or other such member that may be straight, curved or combinations thereof in different embodiments. The elongated member 45 may provide operable communication between the working assembly 20 and the battery pack 30 so that the battery pack 30 can power the working assembly 20 (e.g., via the motor). In some embodiments, the casing 40 may be formed from one or more plastic or other rigid components that may be molded to have a desired shape. The casing 40 may substantially enclose the battery compartment, control circuitry and/or other components associated with powering and/or controlling the operation of the trimmer 10. However, it should also be appreciated that the battery pack of some alternative embodiments may be housed within a backpack that may be worn on the operator's back. In such an example, the battery pack may be connected to the trimmer 10 via a cord or other adaptor.

In an example embodiment, the trimmer 10 may include a rear handle 50 and a front handle 60. The rear handle 50 may be disposed in-line with the elongated member 45 proximate to the casing 40, while the front handle 60 may be disposed between the casing 40 and the working assembly 20 at an intermediate portion of the elongated member 45. An operator of the trimmer 10 may use one hand to hold the front handle 60 and the other hand to hold the rear handle 50 while operating the trimmer 10. In some embodiments, the rear handle 50 may include a trigger 52 or other control mechanism for engaging operation of the motor to power the working assembly 20.

Although FIG. 1 shows the front handle 60 being positioned forward of the rear handle 50 along the elongated member 45, it should also be appreciated that other arrangements for holding and operating the trimmer 10 may be provided. For example, in some cases, a "handlebar" embodiment may be provided in which the front and rear handles 60/50 are replaced by a single handle assembly attached to the elongated member 45 where both handles on the handle assembly are substantially equidistant from the working assembly 20 and disposed spaced apart from the elongated member 45 on opposites sides thereof on a handlebar assembly. Other arrangements are also possible. Placement of the trigger 52 may also be moved to various different locations in corresponding different embodiments.

The trimmer 10 may further employ a trim shield 65 that is configured to prevent cut materials and/or debris from coming back at the operator. The operator may actuate the trigger 52 to power the working assembly and turn the trimmer head 25. The trimmer head 25 may include trimmer line 70 that may extend outwardly (e.g., in a radial direction relative to a shaft forming an axis about which the trimmer head 25 rotates) from the trimmer head 25 to cut vegetation encountered thereby. The trim shield 65 may employ a single knife element (not shown in FIG. 1) to cut the trimmer line 70 to a length slightly less than the distance from the external periphery of the trimmer head 25 to the internal periphery of the trim shield 65 responsive to rotation of the trimmer head 25.

In an example embodiment, the motor may be a DC motor or a brushless DC motor (BLDC) that is powered by the battery pack 30. The motor may be configured to turn in either the clockwise or counterclockwise direction when a power switch 72 is powered on, and the trigger 52 is actuated. In the example of FIG. 1, the power switch 72 may be provided at a control panel or control assembly that may be positioned proximate to the rear handle 50. However, the control assembly could be positioned at any of a number of other locations on the trimmer 10 in alternative embodiments. Moreover, it should be appreciated that gasoline powered embodiments may replace the trigger 52 with a throttle and may replace the battery pack with a gasoline engine. The general structure, however, of even such gasoline powered embodiments may generally be similar and, as indicated above, the power unit may therefore be electric or gas powered.

In some embodiments, the control assembly may further include a directional switch 80 that may be used to select the direction of rotation (e.g., clockwise or counterclockwise) of the trimmer head 25. The rotation of the trimmer head 25 may cause the trimmer line 70 (which may be monofilament line) to stiffen extensively based on centrifugal forces applied to the trimmer line 70 during rotation. The faster the rotation, the stiffer the trimmer line 70 generally becomes. The trimmer line 70 can therefore make a good cutting tool for the cutting or trimming of most vegetation that is not substantially woody.

Based on the position of the operator relative to various structures that may be encountered while operating the trimmer 10, the operator may choose to change the direction of rotation of the trimmer head 25 via operation of the directional switch 80. The directional change may allow the operator to throw cut vegetation in a desired direction without repositioning the operator's body, but instead merely by selecting a different direction of rotation for the trimmer head 25. During operation, it is typically inevitable that the trimmer line 70 will be worn during use. The wearing forces acting on the trimmer line 70 may cause the line to break, abrade or otherwise shorten in length over time. To re-extend the trimmer line 70 to full length, the trimmer head 25 may be "bumped" on the ground to release additional trimmer line 70, or any other trimmer line 70 release mechanism may be employed. As the trimmer line 70 is rotated thereafter, the trimmer line 70 may repeatedly strike the trim shield 65 if it is not cut. Accordingly, the trim shield 65 may incorporate a knife on an inner portion thereof to cut the trimmer line 70 to a length that does not permit the trimmer line 70 to reach the trim shield 65.

In accordance with an example embodiment, the trim shield 65 may be made of molded plastic, although other rigid materials could be employed in alternative embodiments. The trim shield 65 may be made to be symmetrical relative to a longitudinal centerline of the trimmer 10, which may be aligned with a centerline of the trim shield 65. FIG. 2 illustrates a perspective view of an interior portion of the trim shield 65 (i.e., a portion of the trim shield 65 that faces the trimmer head 25) of an example embodiment.

The trim shield 65 may include a mounting portion 90 and a shield portion 95. The mounting portion 90 may generally be provided at a top portion of the trim shield 65, which may sit generally above the trimmer head 25. The mounting portion 90 may include one or more structures to which the elongated member 45 is attachable. The shield portion 95 may include all remaining portions of the trim shield 65 other than the mounting portion 90. In some cases, the shield portion 95 may include a radial deflector portion 97 and a top guard portion 99. The top guard portion 99 may extend between the radial deflector portion 97 and the mounting portion 90. Meanwhile, the radial deflector portion 97 may form a wall that is configured to protect the operator from debris by extending substantially perpendicular to the ground when the trimmer 10 is being used normally (e.g., so that the trimmer line 70 rotates in a plane that is substantially parallel to the ground plane).

The trim shield 65, and in some cases particularly the shield portion 95 thereof, may be divided into two symmetrical halves. For example, the trim shield 65 may include a first housing portion 100 and a second housing portion 110. The first housing portion 100 may be disposed on one side of a longitudinal centerline 120 of the device and the second housing portion 110 may be disposed on the opposite side of the longitudinal centerline 120 relative to the first housing portion 100. Accordingly, in terms of both weight and area, shield portion 95 may be substantially symmetrical relative to the longitudinal centerline 120.

The trim shield 65 may also include a cutter mount 130 and a cutter member 140. The cutter mount 130 may be made from molded plastic or other rigid material. Moreover, in some examples, the cutter mount 130 may be integrally formed with the shield portion 95 so that, for example, the cutter mount 130 is molded with the shield portion 95. The cutter mount 130 may in any case be disposed at the longitudinal centerline 120 on an interior portion of the trim shield 65 (i.e., facing the trimmer head 25). In some examples, the cutter mount 130 may be provided proximate to an intersection of the first housing portion 100 and the second housing portion 110 and/or at the intersection of the radial deflector portion 97 and the top guard portion 99. Furthermore, in some cases, the cutter mount 130 may be provided at the longitudinal centerline 120 such that substantially equal portions of the cutting member 140 extend to respective opposing sides of the longitudinal centerline 120 when the cutting member 140 is attached to the cutting mount 130.

In accordance with an example embodiment, the cutting member 140 may be a unitary piece of steel or other suitable rigid material. In some cases, the cutting member 140 may be a piece of steel that has a relatively constant thickness except at a first knife edge 142 and a second knife edge 144, which may be disposed on opposite sides of the cutting member 140 relative to each other, and which may each have tapered thicknesses to form a blade edge. In an example embodiment, the first and second knife edges 142 and 144 may be disposed on the cutting member 140 to face in substantially opposite directions to cut trimmer line 70 when the trimmer line 70 approaches the cutting member 140 from each opposing direction. As such, for example, the first and second knife edges 142 and 144 may be formed to extend along lines that are parallel to each other and substantially perpendicular to the ground plane. In some cases, the first and second knife edges 142 and 144 are each spaced apart from the longitudinal centerline 120 and/or the axis of rotation of the trimmer head 25 by the same amount. Thus, first and second knife edges 142 and 144 are configured to cut the trimmer line 70 to the same length regardless of the direction of rotation of the trimmer head 25.

As such, the cutting member 140 provides two blades on a single piece of material that are configured to cut in opposing directions. In some cases, the first and second knife edges 142 and 144 may further be angled relative to the remainder of the surface of the cutting member 140. In this regard, the first and second knife edges 142 and 144 may be angled slightly inwardly or toward the axis of rotation of the trimmer head 25. Thus, for example, a majority of the cutting member 140 may be disposed to extend downward from the point at which the cutting member 140 is mounted to the cutter mount 130 and the majority of the cutting member 140 may therefore lie in a plane that is a first distance away from the axis of rotation of the trimmer head 25. Meanwhile, the first and second knife edges 142 and 144 may be angled out of the plane toward the axis of rotation of the trimmer head 25 and may therefore be closer to the axis of rotation of the trimmer head 25 than the majority of the cutting member 140.

In an example embodiment, the cutter mount 130 may be substantially symmetric relative to the longitudinal centerline 120 and the cutting member 140 may be affixed to the cutter mount 130 to also be symmetric relative to the longitudinal centerline 120. In some cases, the cutting member 140 may be affixed to the cutter mount 130 via a pair of screws or some other fixing members. For example, a first fixing member 150 and a second fixing member 152 may be provided to pass through a portion of the cutting member 140 (e.g., a top portion thereof) to engage receiving holes (which may be threaded) of the cutter mount 130. The first and second fixing members 150 and 152 may each being disposed on opposite sides of the longitudinal centerline 120 and may be spaced apart from the longitudinal centerline 120 (and the axis of rotation of the trimmer head 25) by equal amounts. The first and second fixing members 150 and 152 may each extend substantially parallel to the first knife edge 142 and the second knife edge 144, respectively, into the cutter mount 130. Accordingly, for example, substantially equal portions of the cutting member 140 in terms of both weight and area may be disposed on opposite sides of the longitudinal centerline 120.

In some embodiments, the bottom portion of the cutting member 140 may be aligned or otherwise provided within the trim shield 65 such that the bottom portion of the cutting member 140 does not extend below a bottom portion of the trimmer shield 65. However, because the trimmer line 70 becomes substantially straight as the trimmer line 70 is rotated at high speed, the trimmer line 70 will not be allowed to sag substantially and the cutting member 140 can still effectively cut the trimmer line 70. In some cases, for example, the edge of the trim shield 65 may be modified in such a way that the trimmer line 70 will not be pushed away below the trim shield 65. Instead, the trimmer line 70 may ride along the edge, and by centrifugal force, when accelerating the trimmer head 25, the trimmer line 70 will straighten up and be cut by the cutting member 140 in both directions due to the cutting member 140 having sharp edges on both sides.

Increased mass away from the longitudinal centerline 120 and toward the outsides of the trim shield 65 may be expected (and has been measured) to increase vibration of the trim shield 65 during operation, which can lead to excessive fatigue of the operator. By concentrating more of the mass of the trim shield 65 near the longitudinal centerline 120, the vibration of the unit may be reduced. In particular, by concentrating the mass of the cutting member 140, screws (e.g., the first and second fixing members 150 and 152), and the cutter mount 130 at the longitudinal centerline 120, and further by making these components symmetric about the longitudinal centerline 120, the vibration of the device 10 can be substantially reduced or even minimized. The operator experience may therefore be improved. However, the cost of the device 10 may also be reduced. Furthermore, by reducing part count, the overall weight of the product may slightly be reduced as well.

In accordance with an example embodiment, a hand-held cutting device is provided. The device may include an elongated member graspable along a portion thereof by an operator, a trimmer head disposed at one end of the elongated member and configured to be rotatable to perform a cutting function using trimmer line held at a portion of the trimmer head, a power unit operably coupled to the trimmer head to selectively cause rotation of the trimmer head, and a trim shield disposed to extend away from the elongate member to a position radially outward relative to the trimmer head proximate to at least a portion of a path traced by a distal end of the trimmer line when the trimmer head is rotated. The trim shield may include a first housing portion disposed on one side of a longitudinal centerline of the device, a second housing portion disposed on an opposite side of the longitudinal centerline and substantially symmetrical relative to the first housing portion, a cutter mount and a cutter member. The cutter mount may be disposed at the longitudinal centerline on an interior portion of the trim shield proximate to an intersection of the first housing portion and second housing portion. The cutting member may be operably coupled to the cutter mount with substantially equal portions of the cutting member extending to respective opposing sides of the longitudinal centerline.

The device or trimmer shield of some embodiments may include additional features that may be optionally added. For example, in some embodiments, (1) the cutting member may include a first knife edge and a second knife edge. In such an example, the first and second knife edges may each face in opposite directions. In an example embodiment, (2) the first and second knife edges may extend along lines that are parallel to each other. In some cases, (3) the first and second knife edges may each be spaced apart from the longitudinal centerline by the same amount. In some embodiments, (4) the cutter mount may be substantially symmetric relative to the longitudinal centerline. In an example embodiment, (5) the cutting member may be affixed to the cutter mount via a first fixing member and a second fixing member. In such an example, the first and second fixing members may each be disposed on opposite sides of the longitudinal centerline. In some cases, (6) the first and second fixing members may each extend substantially parallel to a corresponding first knife edge and a second knife edge of the cutting member.

In some embodiments, any or all of (1) to (6) may be employed in addition to the optional modifications or augmentations described below. For example, in some embodiments, equal portions of the cutting member by both weight and area may be disposed on opposite sides of the longitudinal centerline. Alternatively or additionally, a bottom portion of the cutting member may be configured such that it does not extend below a bottom portion of the trimmer shield. Alternatively or additionally, the trim shield may include a mounting portion to which the elongate member is attached, and a shield portion. The shield portion may include a radial deflector portion and a top guard portion. The cutter mount may extend toward the trimmer head from a portion of the shield portion at which the longitudinal centerline, the radial deflector portion, and the top guard portion intersect.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although That which is claimed:

1. A hand-held cutting device comprising:
an elongated member graspable along a portion thereof by an operator;
a trimmer head disposed at one end of the elongated member and configured to be rotatable to perform a cutting function using trimmer line held at a portion of the trimmer head;
a power unit operably coupled to the trimmer head to selectively cause rotation of the trimmer head; and
a trim shield disposed to extend away from the elongated member to a position radially outward relative to the trimmer head proximate to at least a portion of a path traced by a distal end of the trimmer line when the trimmer head is rotated,
wherein the trim shield comprises:
a first housing portion disposed on one side of a longitudinal centerline of the device;
a second housing portion disposed on an opposite side of the longitudinal centerline and substantially symmetrical relative to the first housing portion;
a cutter mount disposed at the longitudinal centerline on an interior portion of the trim shield proximate to an intersection of the first housing portion and second housing portion, the cutter mount extending downward from an end of the trimmer shield that is configured to be operably coupled to the elongated member and comprising a first fixing member and a second fixing member; and
a cutting member operably coupled to the cutter mount with substantially equal portions of the cutting member extending to respective opposing sides of the longitudinal centerline, the cutting member comprising a single knife element, the single knife element comprising a first knife edge and a second knife edge,
wherein the cutting member is operably coupled to the cutter mount via the first and second fixing members, the cutting member extending downward from and parallel to the first and second fixing members.

2. The device of claim 1, wherein the first and second knife edges each face in opposite directions.

3. The device of claim 2, wherein the first and second knife edges extend along lines that are parallel to each other.

4. The device of claim 2, wherein the first and second knife edges are each spaced apart from the longitudinal centerline by the same amount.

5. The device of claim 1, wherein the cutter mount is substantially symmetric relative to the longitudinal centerline.

6. The device of claim 5, wherein the first and second fixing members are each disposed on opposite sides of the longitudinal centerline.

7. The device of claim 1, wherein equal portions of the cutting member by both weight and area are disposed on opposite sides of the longitudinal centerline.

8. The device of claim 1, wherein a bottom portion of the cutting member does not extend below a bottom portion of the trimmer shield.

9. The device of claim 1, wherein the trim shield comprises a mounting portion to which the elongate member is attached, and shield portion, wherein the shield portion comprises a radial deflector portion and a top guard portion, and wherein the cutter mount extends toward the trimmer head from a portion of the shield portion at which the longitudinal centerline, the radial deflector portion and the top guard portion intersect.

10. A trim shield for a hand-held cutting device that provides the trim shield proximate to an end of an elongated member graspable along a portion thereof by an operator, the trim shield being disposed proximate to a trimmer head provided at one end of the elongated member and configured to be rotatable to perform a cutting function using trimmer line held at a portion of the trimmer head, the trim shield comprising:
a first housing portion disposed on one side of a longitudinal centerline of the device;
a second housing portion disposed on an opposite side of the longitudinal centerline and substantially symmetrical relative to the first housing portion;
a cutter mount disposed at the longitudinal centerline on an interior portion of the trim shield proximate to an intersection of the first housing portion and second housing portion, the cutter mount extending downward from an end of the trimmer shield that is configured to be operably coupled to the elongated member and comprising a first fixing member and a second fixing member; and
a cutting member operably coupled to the cutter mount with substantially equal portions of the cutting member extending to respective opposing sides of the longitudinal centerline, the cutting member comprising a single knife element, the single knife element comprising a first knife edge and a second knife edge,
wherein the cutting member is operably coupled to the cutter mount via the first and second fixing members, the cutting member extending downward from and parallel to the first and second fixing members.

11. The trim shield of claim 10, wherein the first and second knife edges each face in opposite directions.

12. The trim shield of claim 11, wherein the first and second knife edges extend along lines that are parallel to each other.

13. The trim shield of claim 11, wherein the first and second knife edges are each spaced apart from the longitudinal centerline by the same amount.

14. The trim shield of claim 10, wherein the cutter mount is substantially symmetric relative to the longitudinal centerline.

15. The trim shield of claim 14, wherein the first and second fixing members are each disposed on opposite sides of the longitudinal centerline.

16. The trim shield of claim 10, wherein equal portions of the cutting member by both weight and area are disposed on opposite sides of the longitudinal centerline.

17. The trim shield of claim 10, wherein a bottom portion of the cutting member does not extend below a bottom portion of the trimmer shield.

18. The trim shield of claim 10, wherein the trim shield comprises a mounting portion to which the elongate member is attached, and shield portion, wherein the shield portion comprises a radial deflector portion and a top guard portion, and wherein the cutter mount extends toward the trimmer head from a portion of the shield portion at which the longitudinal centerline, the radial deflector portion and the top guard portion intersect.

* * * * *